Patented Sept. 22, 1925.

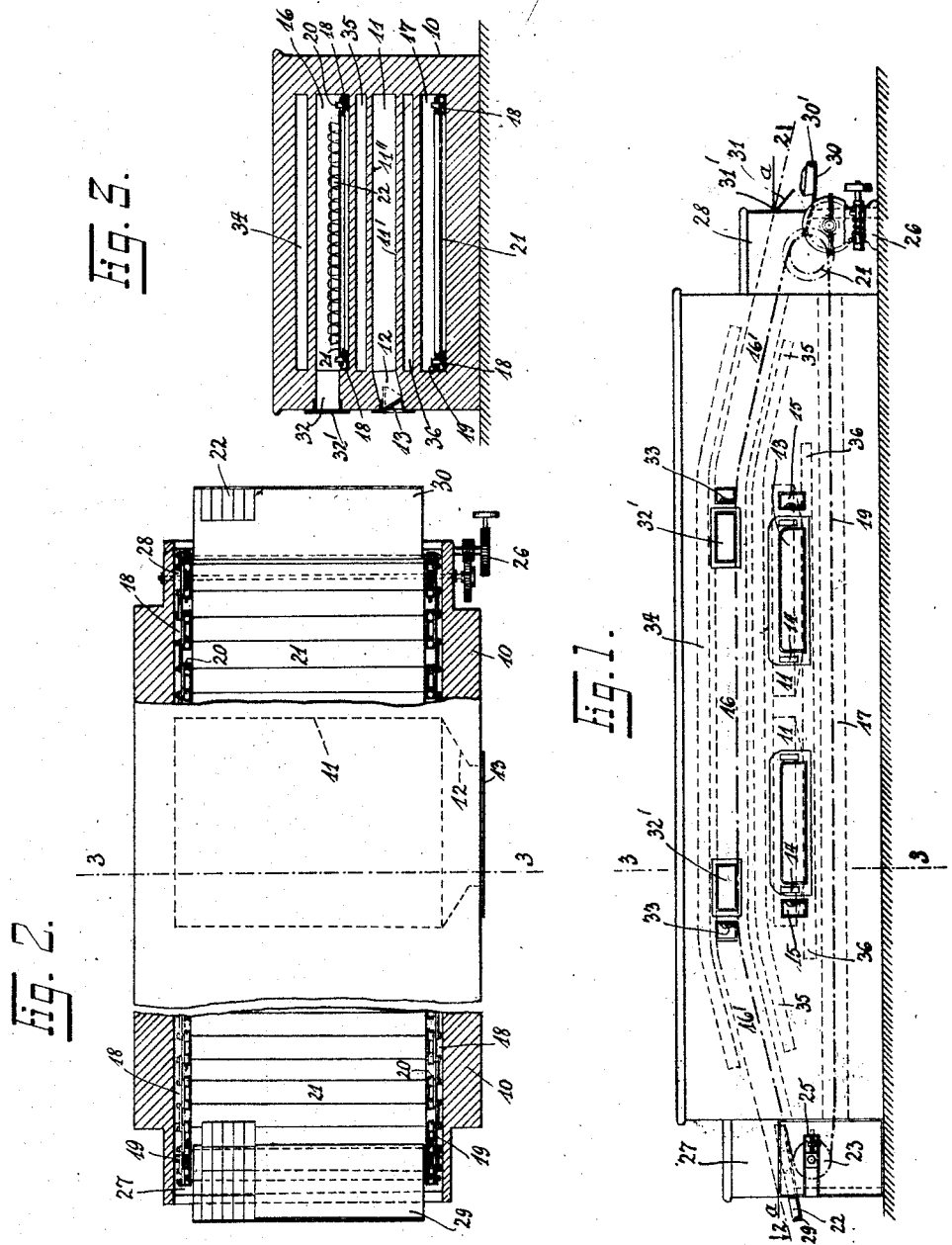

1,554,256

UNITED STATES PATENT OFFICE.

ROBERT ELMER BAKER, OF BRONXVILLE, AND LAURENCE SEYMOUR HARBER, OF KATONAH, NEW YORK, ASSIGNORS TO JOSEPH BAKER SONS & PERKINS COMPANY, INC., OF WHITE PLAINS, NEW YORK, A CORPORATION OF NEW YORK.

BAKING OVEN.

Application filed September 16, 1920. Serial No. 410,713.

*To all whom it may concern:*

Be it known that we, ROBERT ELMER BAKER and LAURENCE SEYMOUR HARBER, both subjects of the King of Great Britain, and residents, respectively, of Bronxville and of Katonah, both in the county of Westchester and State of New York, have invented certain new and useful Improvements in Baking Ovens, of which the following is a specification.

This invention relates to an improved oven for bakeries which is so constructed as to combine, in one structure, a so-called "peel" oven for baking bread while the loaves are stationary, and a "traveling plate oven" through which the loaves are carried with a continuous motion while supported on a conveyor having plates on which the loaves, or rather the molds or other receptacles containing the loaves, are deposited at one end of the oven, and from which they are removed at the other end.

Without desiring to restrict ourselves to the details illustrated, we will now describe the preferred and satisfactory form of our invention shown in the accompanying drawings, in which Fig. 1 is a side elevation of the combined peel and traveling plate oven; Fig. 2 is an approximately horizontal section through parts of said oven, substantially on the plane indicated by the line 2—2 of Fig. 1; and Fig. 3 is a vertical cross section on line 3—3 of Figs. 1 and 2.

The particular embodiment illustrated comprises a peel oven with two stationary hearths, and a traveling plate oven the upper and lower runs of whose conveyor extend above and below said hearths respectively. The body of the oven is indicated at 10, and the two stationary hearths at 11, these hearths or stationary baking chambers having floors 11' and roofs 11'' (Fig. 3), and being also provided at one side, as shown, with a throat 12 which is both contracted or tapered (Fig. 2) and inclined downwardly (Fig. 3) towards its outer end, which is normally closed by a door 13, which has a counterweight 14 to keep it in either the open or the closed position. at one side of each of the baking chambers 11, we have also indicated a box or casing containing an electric bulb 15, for illuminating the interior of the chamber 11 through an appropriate window. We wish it to be understood that any well-known or approved construction may be adopted for the several parts of the combined oven, our invention residing rather in the relative arrangement of said parts than in their individual construction.

Longitudinally of the oven body 10, two chambers or passages are arranged therein to receive the traveling plate conveyor, said passages being preferably of about the same width as the hearths or stationary baking chambers 11, which latter are shown as located at the same level, while the upper longitudinal passage 16 extends above said hearths, and the lower longitudinal passage 17 is disposed beneath the stationary baking chambers 11. The lower passage serves for the return of the conveyor. The upper longitudinal passage, which forms the chamber in which the loaves carried by the upper run of the conveyor are baked, is of peculiar construction in that its central, preferably horizontal portion is so arranged relatively to its downwardly inclined end portions 16' that the level of the floor of said central portion will be above the level of the roof of said passage at the lower ends of the said inclined portions, said lower roof level being indicated at *a* in Fig. 1. The conveyor itself may be of any suitable type, although we prefer to employ the particular construction invented by us and forming the subject-matter of another application for a patent filed in the United States Patent Office on March 28, 1921, Serial No. 456,099. The drawing indicates at 18 tracks located in the passages 16, 17 at each side, near the floor, and a conveyor having chains 19 at opposite sides with rollers 20 adapted to run on said tracks, and with plates 21 connecting the two chains and adapted to support the boxes or other receptacles 22 containing the loaves. The conveyor chains 19 pass over suitable supporting wheels 23, 24, at least one set of which, as 23, is journaled in bearings adjustable lengthwise, as indicated at 25, for the purpose of giving the conveyor chains the proper tension. A continuous traveling motion may be imparted to the conveyor in any suitable manner, say by means of drive mechanism 26 connected with the set of wheels 24. The wheels 23, 24 are illustrated as contained in housings 27, 28 respectively at the ends of the body 10. Partly within the housing 27 at the inlet end of the chamber 16, and partly projecting in advance of said housing is a stationary plate 29 the width of which is practically equal to that of the conveyor, said plate being inclined upwardly and inwardly, and having its inner end close to the inclined entrance run of the conveyor in the chamber 16, so as to deliver thereto the receptacles 22 which an attendant pushes upwardly along said plate until they are caught by the conveyor. At the delivery end of the oven is located another plate 30, likewise inclined upwardly and inwardly, the upper end of said plate being close to the conveyor, so that the receptacles 22 will pass automatically from the conveyor to said plate 30, to be removed by an attendant. Preferably, the plate 30 has a transverse stop 30′ at its lower end. The escape of hot air from the baking passage 16 is prevented largely by the fact that the lowermost points of its roof, as indicated by the level $a$, are below the level of the floor of the main or central portion of the said passage 16, so that the air in said central portion is trapped, as it were. As a further means for minimizing the escape of such air, we have shown a swinging flap or door 31, pivoted about a transverse axis 31′ and adapted to engage the receptacles 22, yet yielding outwardly to allow them to pass out of the baking chamber 16. Adjacent to the baking passage 16, we have shown openings 32, with windows 32′, of glass or other transparent material, through which the interior of the passage may be inspected, said passage being lighted, in the neighborhood of the openings or sights 32, by electric bulbs 33 placed in suitable casings, as indicated in Fig. 1.

The oven illustrated is provided with three heating flues or sets of heating flues. The upper flue 34 extends in the body 10 above the roof of the baking passage 16, the middle flue 35 is arranged between the bottom of said passage and the roofs of the stationary hearths 11, and the lower flue 36 lies between the floors of said hearths and the roof of the return passage 17. The hearths 11 therefore are heated both from above and from below, and the same thing is true of the baking passage 16. The lower passage 17, however, through which the return portion of the conveyor passes, receives much less heat, since there is no heating flue below it. Owing to this arrangement the lower run of the conveyor on its travel through said lower passage will have an opportunity to cool off to a certain extent, yet since said lower passage is enclosed and receives a certain amount of heat by radiation, we avoid chilling of the return run of the conveyor. As regards the particular heating means employed in connection with the flues 34, 35, 36, these may be gas burners or any other well-known or approved devices suitable for this purpose, or gases heated elsewhere may be introduced into said flues; for this reason, we have deemed unnecessary to show any heating means proper.

The combined oven embodying the principles explained above is very compact and economical, and enables each of its sections, both the stationary hearth section and the traveling plate section, to be operated without interference with the other, the hearth section being accessible from one side of the body 10, and the other section from the ends.

We claim as our invention:

1. In a oven, an endless conveyor extending longitudinally of said oven and having an upper working run and a lower return run, an upper baking chamber and a lower chamber enclosing the upper and lower runs respectively of said conveyor, a first and a second longitudinally extending flue located closely adjacent to the upper and lower walls respectively of said upper baking chamber, a third heating flue located closely adjacent to the upper wall of said lower chamber and vertically spaced from said second heating flue, and a baking chamber extending transversely of said oven and having its upper and lower walls closely adjacent to said second and third heating flues respectively, whereby said baking chambers will be subjected to a more intense heat than said lower chamber due to the additional heat supplied to said baking chambers by said second heating flue.

2. In an oven, an endless conveyor extending longitudinally thereof and having an upper working run and a lower return run, said upper run extending substantially horizontally through the central portion of said oven and having its end portions inclined downwardly from said central portion, an upper baking chamber enclosing said upper run and extending in parallelism therewith, said oven being provided at each end of said chamber with an opening in communication with said chamber for charging and discharging said conveyor, the upper ends of said openings being located in a plane lying below the plane of the lower wall of the central portion of said chamber to prevent escape of heat from said chamber, a lower chamber enclosing said lower run of said conveyor, an upper heating flue and a lower heating flue extending longitudinally of said oven in parallelism with and closely adjacent to said upper baking chamber and said lower chamber respectively, a stationary baking chamber extending transversely of said oven and located in the space between the raised central portion of said upper baking chamber and said lower chamber and an intermediate flue located between said upper baking chamber and said stationary baking chamber to co-operate with said upper and lower flues for heating said upper baking chamber and said stationary chamber respectively.

In testimony whereof we have signed this specification.

ROBERT ELMER BAKER.
LAURENCE SEYMOUR HARBER.